United States Patent [19]

Mosher

[11] 4,211,321
[45] Jul. 8, 1980

[54] COMPACT LOW FORCE ECONOMICAL GENERAL PURPOSE WALKING BEAM CONVEYOR

[75] Inventor: Ralph S. Mosher, Elnora, N.Y.

[73] Assignee: Robotics, Inc., Ballston Spa, N.Y.

[21] Appl. No.: 900,297

[22] Filed: Apr. 26, 1978

[51] Int. Cl.$^2$ .............................................. B65G 25/00
[52] U.S. Cl. ..................................................... 198/774
[58] Field of Search ........................ 198/774, 775, 776; 432/122

[56] References Cited

U.S. PATENT DOCUMENTS

| | | | |
|---|---|---|---|
| 3,187,883 | 6/1965 | Umbright | 198/774 |
| 3,324,992 | 6/1967 | Morgan | 198/774 |
| 3,687,275 | 8/1972 | Broser | 198/774 X |

*Primary Examiner*—Robert B. Reeves
*Assistant Examiner*—Douglas D. Watts
*Attorney, Agent, or Firm*—Charles W. Helzer

[57] ABSTRACT

A walking beam conveyor is described which comprises a movable load supporting, walking beam member. A supporting truss is secured to and supports the walking beam member and comprises first and second orthogonally arrayed interconnected supporting truss arms. The first and second truss arms each include scotch yoke rollerway guides. First and second scotch yoke cam rollers engage the scotch yoke rollerway guides on the the first and second truss arms, respectively, and serve to physically support and move the supporting truss and walking beam member along horizontal and vertical axes. The cam rollers are secured to the ends of the first and second sets of crank arms which in turn are driven from first and second intermittor drives. The structure is supported on a base frame which secures the pillow block supports for the rotatable shafts that are keyed to the first and second sets of crank arms. The supporting truss is T-shaped wherein the cross arms of the T-shaped member comprise the first truss arm and form the scotch yoke rollerway guides for physically supporting and moving the supporting truss in a vertical direction and the base of the T-shaped member comprises the second truss arm and serves as a horizontal scotch yoke guide rollerway for moving the supporting truss and walking beam member forward and back in a horizontal direction. The walking beam conveyor further includes a spring driven counter-balancing torquing arrangement for applying a counter-balancing torque to the rotatable shafts that rotate the crank arms. The cam rollers on one side of the walking beam conveyor comprise roller wheels having a V-shaped outer periphery. The cam rollers on the opposite side of the conveyor are provided with smooth cylindrical surfaces.

23 Claims, 12 Drawing Figures

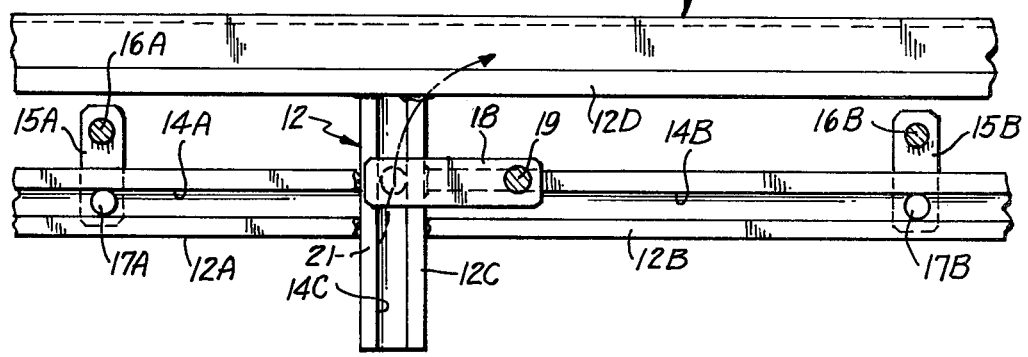
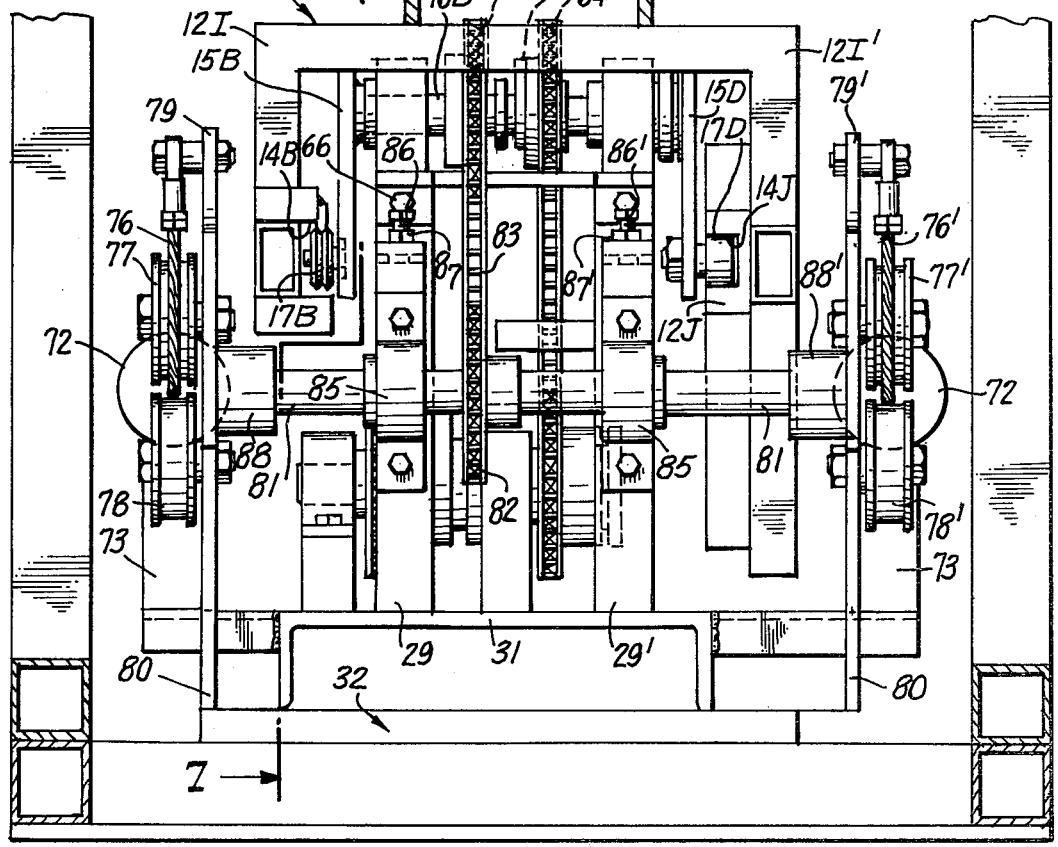
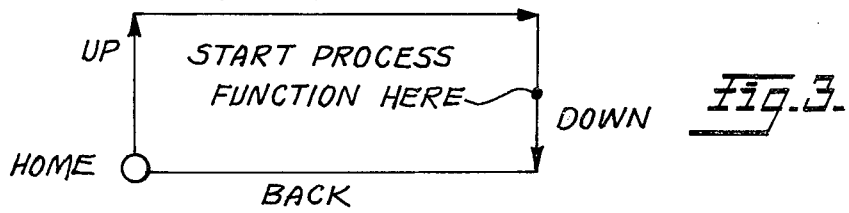

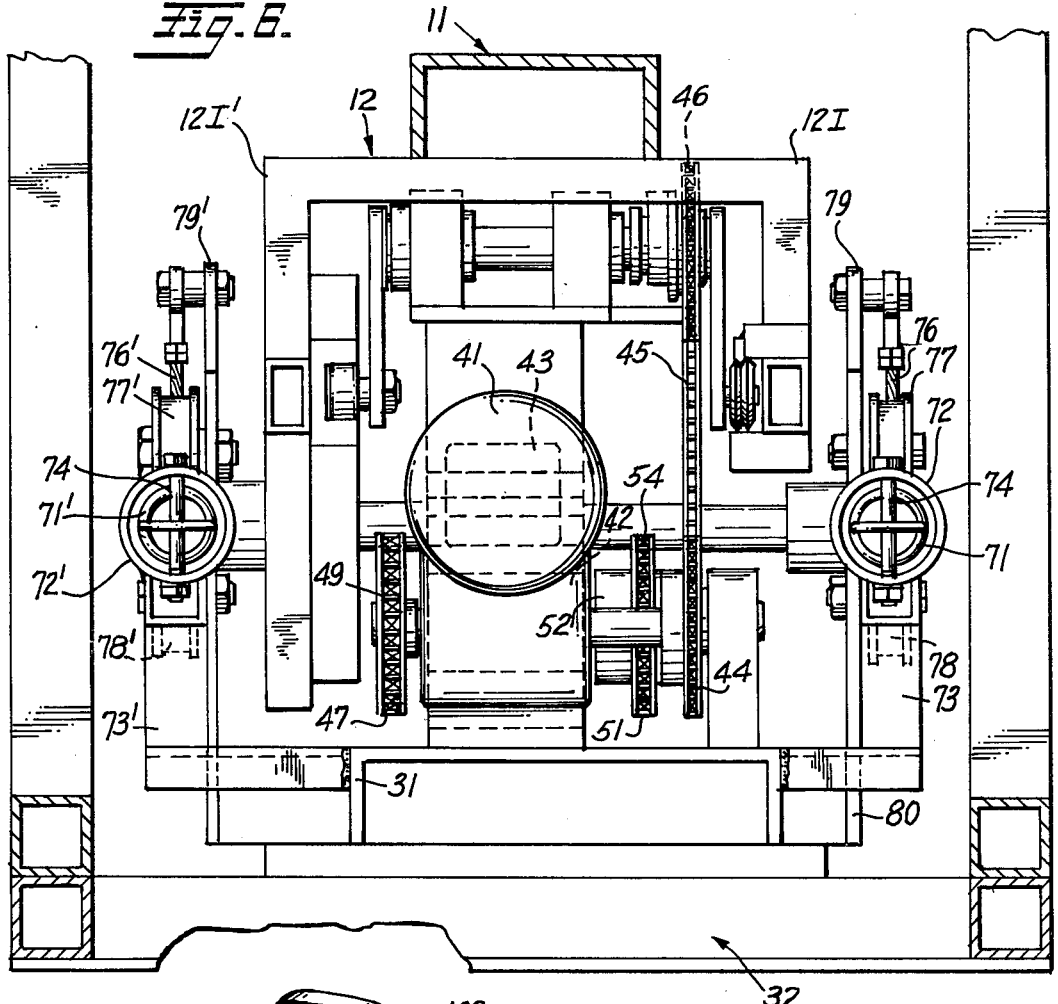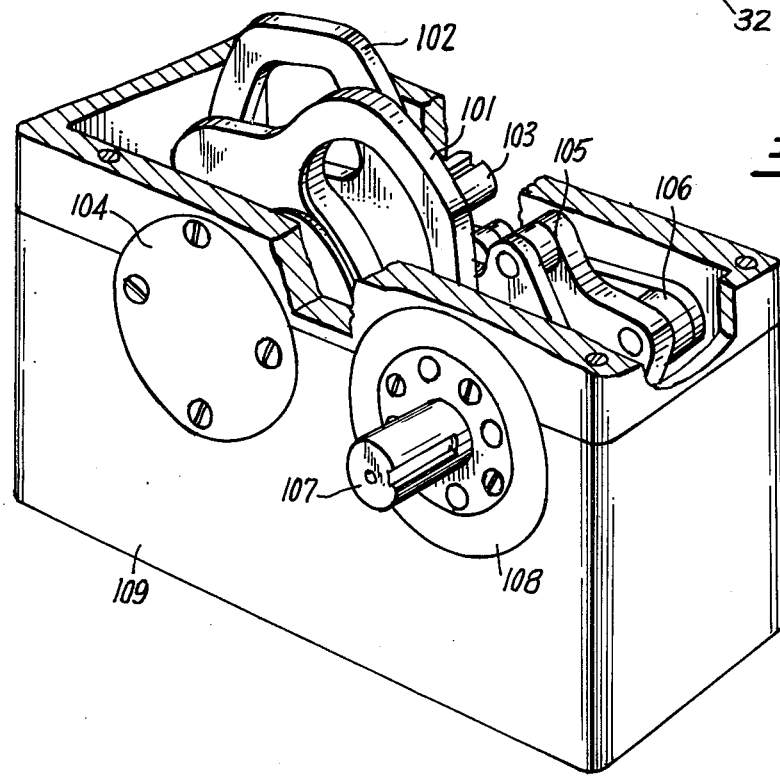

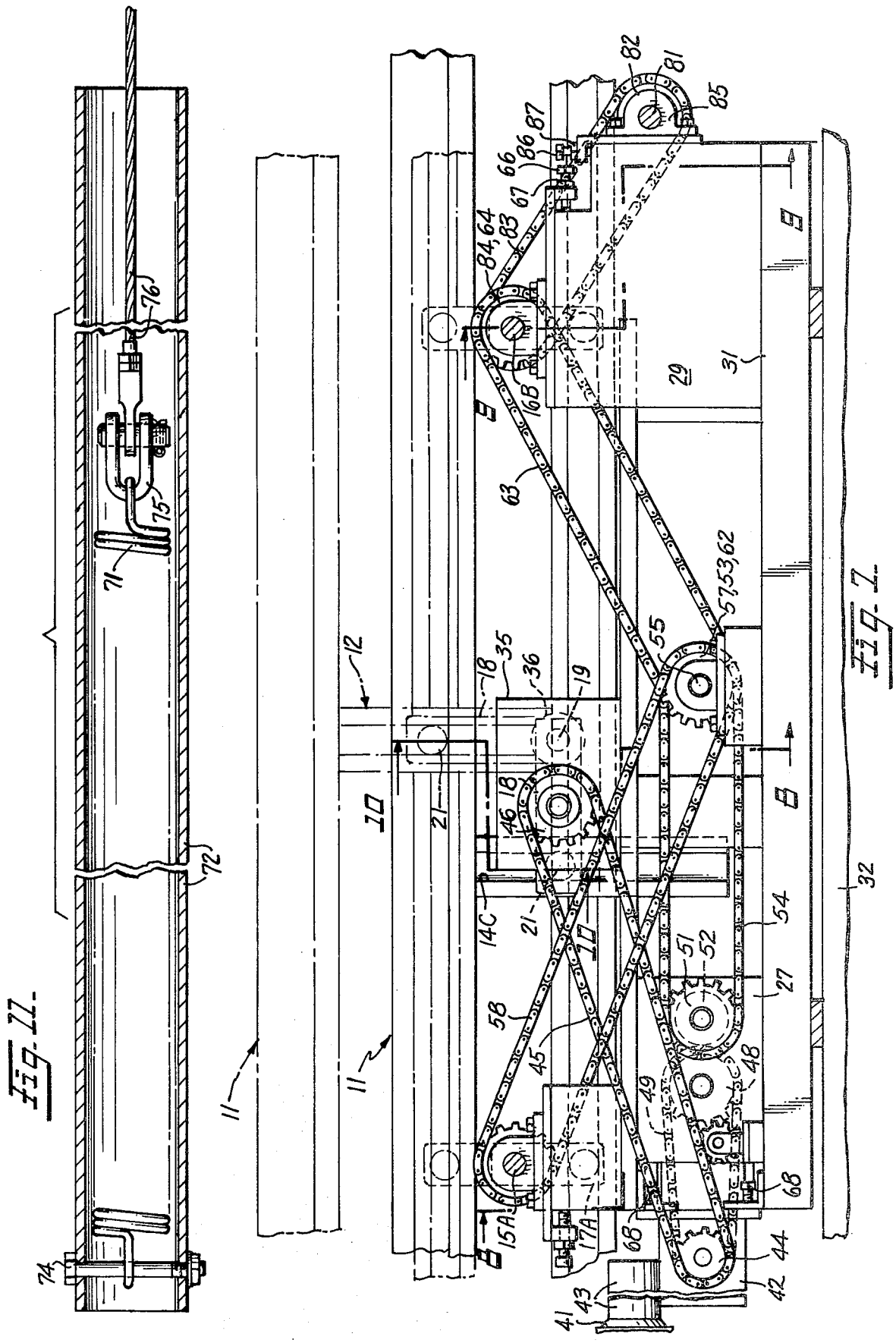

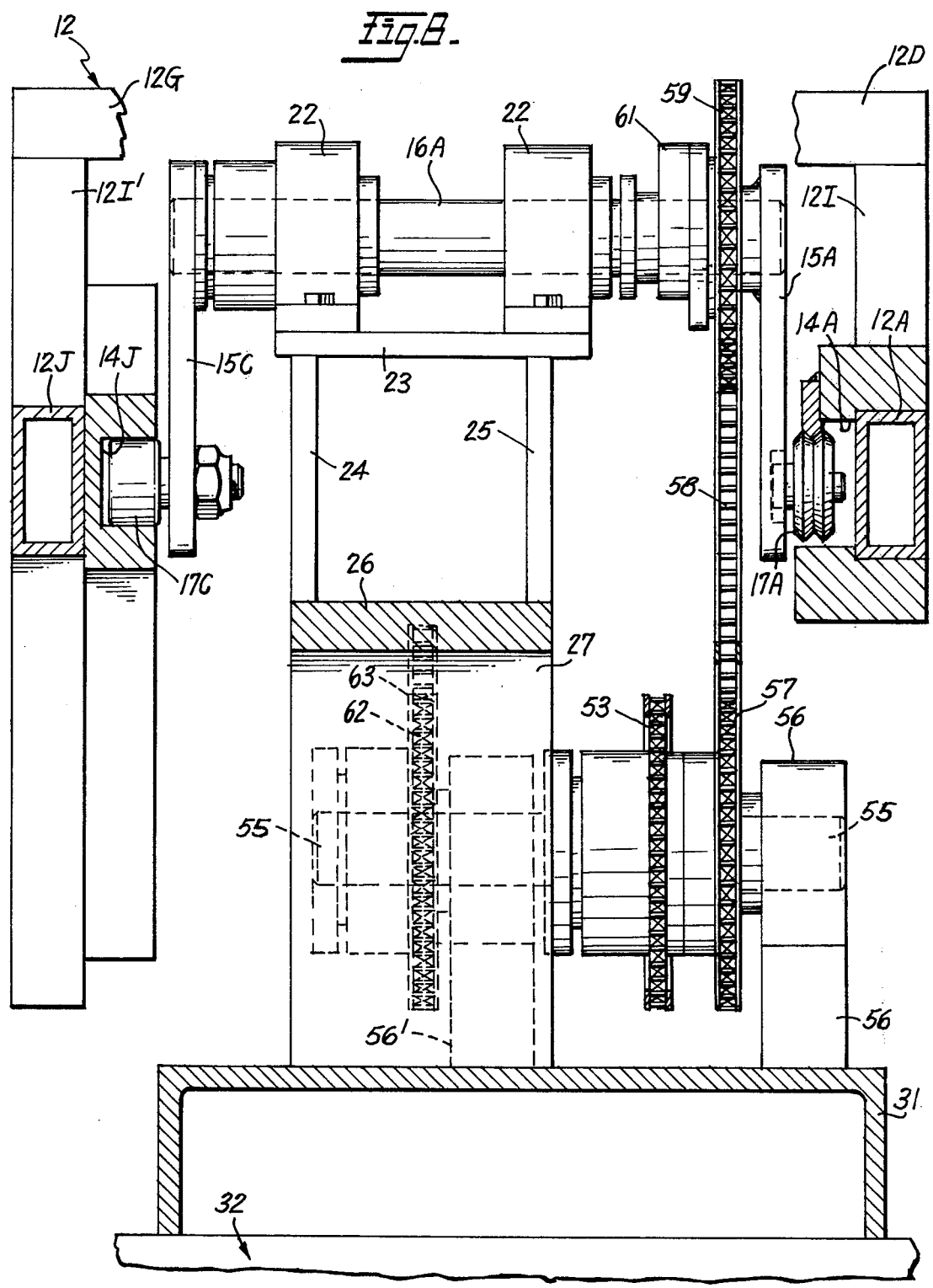

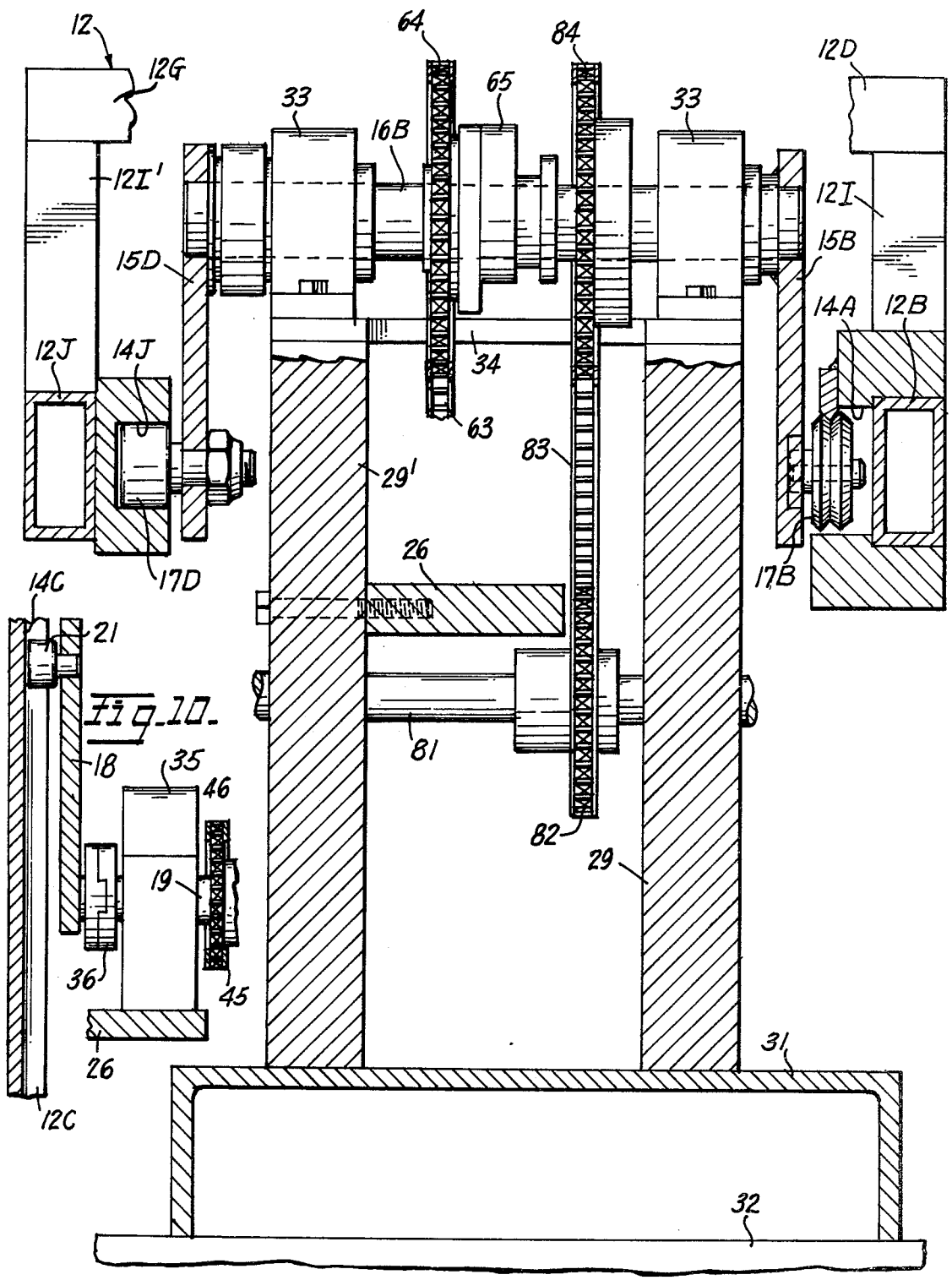

COMPACT LOW FORCE ECONOMICAL GENERAL PURPOSE WALKING BEAM CONVEYOR

BACKGROUND OF INVENTION

1. Field of Invention

This invention relates to a conveyor mechanism of the walking beam type.

More specifically, the invention relates to a compact, low cost, general purpose walking beam conveyor for automatically transferring work pieces in a straight-line path from a pick-up station to a discharge station where they can be used in a manufacturing assembly operation, or the like. The walking beam conveyor according to the invention is designed to employ conventional, commercially available components, a minimum number of mechanical linkages, low friction moving parts of proper design and so interconnected that build-up of internal conflicting binding and frictional forces are avoided or minimized, and minimum size drive components are used for a given size design load range by employing conter-balancing spring developed forces which assist the load bearing members.

2. Background Problem

Walking beam conveyors have been used for the purpose of automatic work piece transfer in the field of automated assembly line manufacturing processes for a number of years. Some of the known walking beam conveyor designs are disclosed in the following U.S. Pat. Nos.: 1,883,763—issued Oct. 18, 1932; 3,089,687—issued May 14, 1963; 3,215,260—issued Nov. 2, 1965; 3,481,450—issued Dec. 2, 1969; and 3,857,479—issued Dec. 31, 1974. From this list of known prior art patents, it will be appreciated that walking beam conveyors have been available to the art for at least fifty years and their use in automated manufacturing facilities is now well established.

Most walking beam conveyors provide a repeated pattern of straight-line movements starting from a neutral or home position which is best described as comprising up-forward-down-back to home position. Halfway through the up movement, the walking beam picks up the work piece or other load to be transferred, moves it forward to a location over the discharge point, deposits the work piece or load at the discharge point half-way through the down movement and then returns back to the home position. The early walking beam conveyor designs, as shown for example in U.S. Pat. No. 1,883,763 and 3,089,687, were made primarily to transfer large and heavy parts such as automobile engine blocks, steel beams and the like. The heavy load and need for accurage location of the load dictated the use of automatic, hydraulic or pneumatic actuators driving through various combinations of mechanical linkages and are complex and costly due to the use of a large number of external control components such as limits, switches, relays, valves, pumps, hydraulic or pneumatic reservoirs, etc. The devices also are relatively slow since one movement must be completed before another can be initiated.

Another category of known walking beam conveyors is exemplified by U.S. Pat. Nos. 3,215,260 and 3,481,450 for use with smaller loads and requires the use of specially designed, multi-groove cams or families of cams mechanically interconnected to provide the desired intermittent up-forward-down-back movement to the walking beam member. These devices, however, require specially designed component drive cams and follower linkages which increase their cost and complexity. U.S. Pat. No. 3,857,479 purportedly describes a less complex and inexpensive walking beam conveyor which employs a motion generating prime mover mechanism that drives an output member around a substantially square path that defines four substantially equal isolated strokes. This design while adequate for light load requirements such as processing candy boxes to be loaded with candy one layer at a time, for example, cannot readily be adapted for use with heavier intermediate weight loads without incurring considerable expense in beefing-up the prime mover mechanism. In order to overcome the deficiencies of the known walking beam conveyor designs and provide an improved, compact, general purpose, low cost walking beam conveyor adaptable for use with intermediate weight loads and the like, the present invention was devised.

SUMMARY OF INVENTION

It is therefore a primary object of the invention to provide a new and improved, compact, low cost, walking beam conveyor of intermediate and substantial load weight carrying capability having a relatively simple drive mechanism comprised of commercially available components, and which employs minimum size drive components for a given design load range.

In practicing the invention, a walking beam conveyor is provided which comprises a movable load supporting walking beam member for transporting loads in a straight-line path between two points comprising pick-up and discharge stations for the load. At least one supporting truss is secured to and supports the walking beam member and comprises first and second, orthogonally arrayed, horizontally and vertically extending, interconnected supporting truss arms. The first and second truss arms each include scotch yoke guide means formed thereon extending along the longitudinal axes of the truss arms. First and second scotch yoke guide means engaging devices are provided for engaging the scotch yoke guide means on the first and second truss arms, respectively, and for physically supporting and moving the supporting truss and walking beam member along two orthogonal, vertical and horizontal axes of movement. First and second rotatable crank arm means are provided each having the first and second scotch yoke guide means engaging devices secured to the respective ends thereof and first and second intermittor drive means are provided for intermittently rotating the respective first and second crank arm means in a predetermined interleaved, intermittent manner. A base frame is provided for supporting the intermittor drive means, the first and second crank arm means together with their related scotch yoke guide means engaging devices which in turn physically and movably support the supporting truss and interconnected walking beam member in a compact walking beam conveyor structure.

The structure also includes an electric motor drive and speed reducing gear supported on the base frame with the electric motor drive being mechanically coupled through the speed reducing gear to drive the first and second intermittor drive means. Additionally, spring-biased, counter-balancing means are mounted on the base frame and act through a lever arm and counter torque coupling arrangement for applying a counter-balancing torque to the first rotatable crank arm means to assist the same in developing a vertical lifting force for lifting and supporting the load and thereby minimize the forces demanded of the first intermittor drive. Phase adjusting means are mounted between the first and second intermittor drives and their respective first and second rotatable crank arms for adjusting the phase relation of the intermittent, interleaved movements imparted to the supporting truss and walking beam conveyor. Also, overload clutch means are connected between the outputs of the first and second intermittor drives and their respective first and second crank arms whereby the intermittor drives can be decoupled from the drive transmission upon the occurrance of an overload condition.

The scotch yoke guide means engaging devices secured to the ends of certain of the first rotatable crank arm means are wheels provided with a V-shaped outer periphery and coact with a complementary V-shaped track that forms the scotch yoke guideway in the first, horizontally extending truss arms. By reason of this feature, frictional forces are maintained to a minimal value and lateral stability is provided to the suspended supporting truss and walking beam member. A second set of conventional roller bearing members having cylindrical roller bearing surfaces coacting with substantially flat rollerway guide surfaces that comprise the scotch yoke guide means on the opposite side of the supporting truss and walking beam member, provide for up-down lifting forces and freedom for movement along the longitudinal axis of the horizontally extending first truss arm. In addition, the design allows lateral freedom of movement for the supporting truss and walking beam member so that there are no stringent conflicting restraining forces built up or otherwise internally generated between the interconnected supporting truss members and crank arms that otherwise might be caused by slight errors in fabrication of the component parts or during assembly of the walking beam conveyor.

The first and second intermittor drive means each comprise self-contained, parallel, cam operated index drives each including an input cam member and an output follower wheel sealed in an oil bath in an oil-tight housing. Each of the index drives provides two dwell periods and two index periods for each complete revolution of the output follower wheel corresponding to two complete revolutions of the input cam member. The output follower wheel of each index drive provides a modified sine, constant velocity output and is connected to and drives a respective one of the first and second rotatable crank arms in a predetermined intermittent manner. The dwell and index periods of the respective first and second intermittor drives are appropriately phased so that the first intermittor drive initially starts with an index period and the second intermittor drive initially starts with a dwell period to thereby provide the desired, intermittent, up-forward-down-back repetitive pattern of movement to the supporting truss and walking beam member.

BRIEF DESCRIPTION OF DRAWINGS

FIG. 3 is a diagramatic sketch illustrating the intermittent pattern of up-forward-down-back movement produced by the walking beam conveyor;

FIG. 4 is a simplified, partial, side elevational view of a T-shaped supporting truss member comprising a part of the walking beam conveyor and having scotch yoke guide rollerways formed in the horizontally extending cross arms thereof and in the vertical extending base thereof, and is helpful in illustrating how a set of intermittently rotated crank arms cause the walking beam conveyor to be moved intermittently along a path depicted by the sketch shown in FIG. 3;

FIG. 5 is a right hand end elevational view partly in section of the walking beam conveyor, taken on the line 5—5 of FIG. 1;

FIG. 6 is a left hand end elevational view, partly in section, of the walking beam conveyor, taken on the line 6—6 of FIG. 1;

FIG. 7 is an enlarged fragmentary side elevational view, similar to FIG. 1, but showing in more detail the walking beam conveyor drive arrangement taken on the line 7—7 of FIG. 5;

FIG. 8 is an enlarged fragmentary vertical sectional view through the walking beam conveyor, taken on the staggered section line 8—8 of FIG. 7;

FIG. 9 is a fragmentary vertical sectional view of the walking beam conveyor, taken on the line 9—9 of FIG. 7;

FIG. 10 is an enlarged fragmentary vertical sectional view of the walking beam conveyor, through the horizontal drive mechanism but with the crank arm and its associated track being shown by phantom lines in the raised position, taken on the line 10—10 of FIG. 7;

FIG. 11 is an enlarged fragmentary longitudinal sectional view through the spring housing for the counterbalancing coil spring employed in the walking beam conveyor, taken on the line 11—11 of FIG. 2; and FIG. 12 is a partially broken away, perspective view of an intermittor index drive mechanism employed in the walking beam conveyor to drive the intermittent horizontal and vertical movements of the apparatus in an up-forward-down-back repeated pattern.

DETAILED DESCRIPTION OF PREFERRED EMBODIMENT

Figure 1:
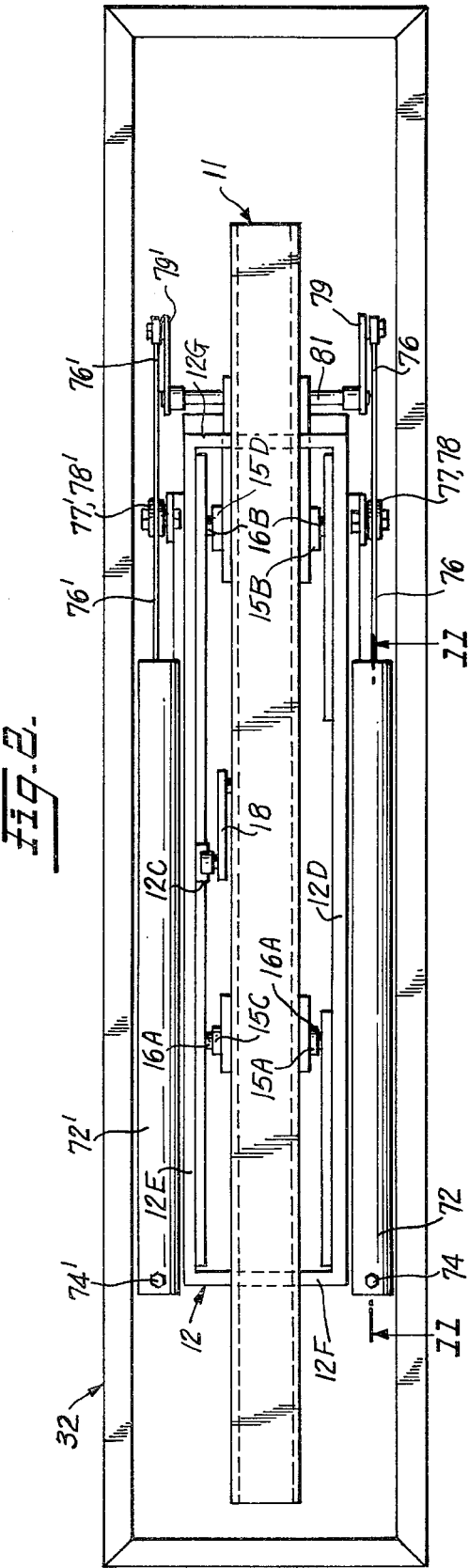
FIG. 1 is a side elevational view of a walking beam conveyor constructed according to the invention.

FIG. 1 is a side elevational view of a walking beam conveyor constructed according to the invention and includes a movable, load supporting, walking beam member 11 for transporting loads in a straight-line path between two points comprising pickup and discharge stations for the load. The walking beam member 11 may, if desired, comprise an upside-down, U-shaped cross-section channel member, a solid beam member, a ladder-shaped array of parallel bars, a rectangular shaped frame fabricated from channel members welded together at their ends, or any other suitable configuration best adapted to support and move a particular load. The walking beam member 11 is secured to and supported by a supporting truss 12 which is essentially T-shaped in configuration with the base of the T extending upwardly as viewed from the side shown in FIGS. 1 & 4. Supporting truss 12 is comprised of a set of first, horizontally extending truss arms 12A and 12B that form the cross arm of the T and a second, vertically extending truss arm 12C that forms the upwardly extending base of the T with the first and second truss arms being welded together or otherwise rigidly secured into a single integral member. The first, horizontally extending truss arms 12A and 12B may be formed by an inwardly facing U-shaped channel member that extends for substantially the full length of the walking beam conveyor and is interconnected through laterally extending U-shaped channel members (not shown) with a cooperating, complementary additional first truss arm comprised of a channel member (shown at 12J in FIGS. 8 and 9) that runs parallel with the first truss arms 12A and 12B. The additional first truss arm 12J together with the first truss arms 12A and 12B and the laterally extending channel members forms a lower closed, rectangularly-shaped supporting frame. This lower rectangular frame extends at right angles to the second truss arm 12C that forms the base of the T and supports an upper rectangular supporting frame comprised by truss members 12B, 12E, 12F and 12G best seen in FIG. 2 by means of vertical supports at each of the four corners of the rectangular frames as shown at 12H and 12I in FIG. 1. The supporting truss thus formed is designed such that the channel member comprising first truss arms 12A and 12B and the coacting channel member 12J on the opposite side comprising the additional first truss arm, form sets of coacting first scotch yoke guide means or guide rollerways as will be explained more fully hereinafter. It should be noted, however, from FIGS. 1 and 2 of the drawings that only a single, second vertically extending truss arm 12C is provided. While it is not required to include coacting, complementary vertically extending truss arms such as 12C on both sides of the supporting truss, if desired or required by a particular job, it would be within the ability of one skilled in the art to provide such an additional vertical truss arm and guideway in the light of the present disclosure.

Figure 2:
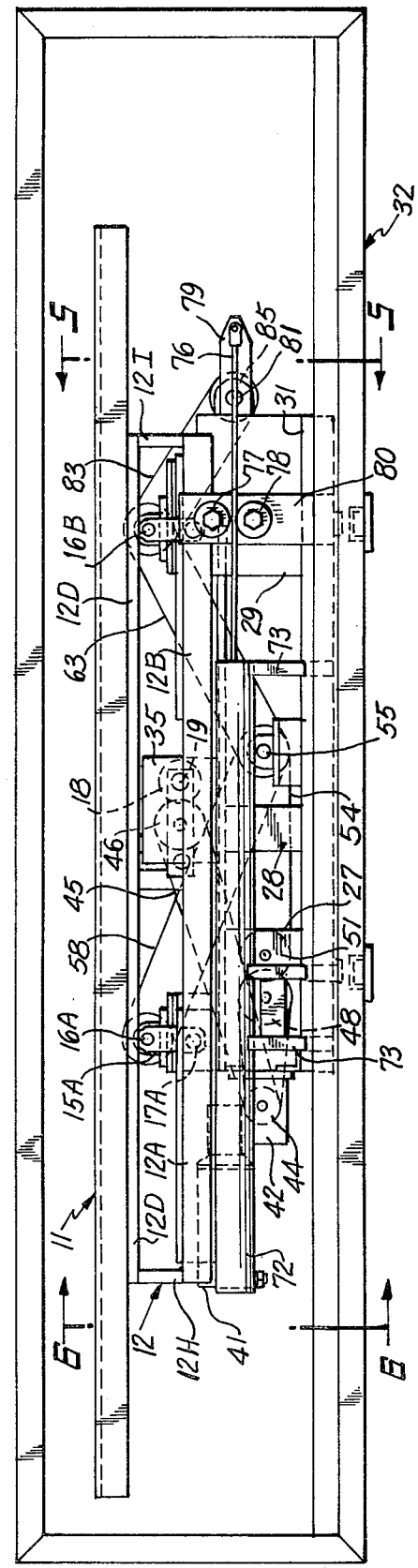
FIG. 2 is a top plan view of the walking beam conveyor shown in FIG. 1.

The design of the walking beam conveyor is such that the movable load supporting walking beam member 11 is moved from a quiescent or home position vertically upward whereby it acquires the load to be transported, then moves horizontally forward (to the right as shown in FIGS. 1 and 2), then downwardly during which movement it deposits the load at the station or point to which the load is to be delivered, and finally moves horizontally backward (to the left as shown in FIGS. 1 and 2) to the quiescent or home position. This predetermined, intermittent, up-forward-down-back pattern of movements is depicted by the sketch shown in FIG. 3 of the drawings.

FIG. 4 of the drawings is a partial side view of the T-shaped supporting truss 12 and is helpful in demonstrating how the intermittent pattern of movement depicted in FIG. 3, is achieved. As shown in FIG. 4, suitable scotch yoke guide means in the form of rollerway guides 14A and 14B extend along the longitudinal axis of the cross arms 12A and 12B of the T-shaped supporting truss 12. A set of first, vertical, crank arm means comprised by crank arms 15A and 15B are secured to and rotate with respective rotatable shafts shown at 16A and 16B. The rotatable shafts 16A and 16B are secured to and supported by a base frame and are rotated in a clockwise direction in synchronism by a suitable intermittor drive to be described hereafter. The crank arms 15A and 15b each have roller wheels shown at 17A and 17B secured to the ends thereof with the roller wheels 17A and 17B being supported within the respective roller guideways 14A and 14B formed in the horizontally extending cross arms 12A and 12B of the T-shaped supporting truss 12. The roller wheels 17A and 17B are free to move horizontally along the guideways 14A and 14B but are restrained from movement along a vertical axis. By this construction, the roller wheels 17A and 17B serve to physically support the T-shaped supporting truss 12 in space and upon rotation of the crank arms 15A and 15B in a clockwise direction will cause the supporting truss 12 to be lifted vertically upward and thereafter returned to its initial vertical position.

The T-shaped supporting truss 12 includes in the vertically extending base of the T thereof a further, second scotch yoke guide means in the form of a roller guideway 14C extending along the vertical axis of the second truss arm 12C at right angles to the truss arms 12A and 12B. Second crank arm means comprised of a crank arm 18 is secured to a rotatable shaft 19 that is journalled in a support on the base frame of the apparatus in a manner to be described more fully hereinafter. A second scotch yoke engaging device in the form of a roller wheel 21 is secured to the end of the second crank arm 18 and is free to move up or down within the scotch yoke guideway 14C in a vertical direction but it is restrained from movement in a horizontal direction by the sides of the scotch yoke roller guideway. By this construction, it will be seen that rotation of the second crank arm 18 in a clockwise direction as indicated by the arrows, will cause the T-shaped supporting truss 12 to be moved first to the right from the position shown in FIG. 4 and thereafter returned to the initial starting position. The freedom for movement of the roller wheels 17A and 17B along the longitudinal axis of scotch yoke guideways 14A and 14B will allow this horizontal movement back and forth between an extreme right hand end position and the home position shown in FIG. 4. By intermittently rotating the crank arms 15A and 15B 180° from their position shown in FIG. 4 to thereby lift the supporting truss 12 upwardly; rotating the crank arm 18 180° from the position shown in FIG. 4 to move the truss 12 to the extreme right position from the position shown in FIG. 4; then rotating the crank arms 15A and 15B another 180° to return them to their initial starting position to move the supporting truss 12 down and thereafter rotating the crank arm 18 through another 180° to return it to its initial starting position, the supporting truss 12 will have been moved through the up-forward-down-back pattern of movement depicted in FIG. 3.

In FIGS. 1, 2 and 7 of the drawings corresponding parts to those described with relation to FIG. 4 have been identified by the same reference character. In FIG. 2 it will be seen that the rotatable shafts 16A and 16B extend across the width of the walking beam conveyor with the crank arms 15A and 15B being secured to one of the ends thereof and a coating set of crank arms 15C and 15D are connected to the opposite ends of shafts 16A and 16B, respectively. The construction is best seen in FIGS. 8 and 9 of the drawings. Referring to FIG. 8, it will be seen that the crank arms 15A and 15C are keyed in common to the respective ends of shaft 16A and rotate in synchronism. The free end of crank arm 15A has a roller wheel 17A having a V-shaped outer periphery rotatably secured to the end thereof which rides along a V-shaped track. The V-shaped track is mounted on an inwardly facing open sided U-shaped channel member that comprises a part of truss arm 12A and defines the scotch yoke guide means 14A. Crank arm 15C has a cylindrical roller wheel 17C rotatably secured to its free end which rides in a substantially flat scotch yoke guideway 14J formed on the additional truss arm 12J. Referring to FIGS. 5&9, it will be seen that the crank arm 15B is keyed or otherwise secured to one end of rotatable shaft 16B which has a crank arm 15D on its opposite end that rotates in synchronism with crank arm 15B. Crank arm 15B supports a roller wheel 17B having a V-shaped outer periphery similar to roller wheel 17A and rides on a complementary V-shaped track in the scotch yoke guideway 14B. Crank arm 15D rotatably supports a cylindrical roller wheel 17D that rides in the scotch yoke guideway 14J in a manner similar to 17C.

Although not shown in FIGS. 1 and 2, the remote ends of the horizontally extending first truss arms 12A and 12B are interconnected with laterally extending truss arms (not shown) corresponding to the laterally extending truss arms 12F and 12G and that extend parallel to and beneath the laterally extending truss arms 12F and 12G, to connect with the horizontally extending, additional first truss arm 12J. The additional first truss arm 12J extends parallel to the first truss arms 12A and 12B and lies in the same plane therewith as seen in FIGS. 8 and 9. The first truss arms 12A and 12B and additional first truss arm 12J are interconnected through the laterally extending truss arms (not shown) to form a lower rigid rectangular supporting frame that extends in a plane perpendicular to the vertically extending truss arm 12C that forms the base of the T-shaped supporting truss 12. The vertically extending support posts 12H and 12I shown in FIG. 1 and 12I' shown in FIGS. 8 and 9 and a further corner post (not shown) extend upwardly from the corners of the lower rectangular supporting frame comprised by the truss arms 12A, 12B and 12J to support the corners of the upper rectangular truss frame formed by truss arms 12D, 12E, 12F and 12G best seen in FIG. 2 of the drawings. The entire structure thus defined is considered to comprise the T-shaped supporting truss 12.

As shown in FIG. 8 of the drawings, the rotatable drive shaft 16A is journalled in pillow blocks 22 which are secured to a back upper base plate 23 that in turn is secured to and supported by a set of spaced-apart, back, vertical support plates 24 and 25. The back, vertical support plates 24 and 25 in turn are secured to and supported by an intermediate base plate 26 that extends for substantially the full length of the conveyor apparatus as shown in FIG. 1 of the drawings. The intermediate base plate 26 in turn is secured to and supported by the top surface of the outer housing of a first, vertical, intermittor drive means 27 (to be described more fully hereinafter), a set of midway spaced-apart vertical support plates, only one of which is shown at 28, spaced midway the length of intermediate base plate 26 as best seen in FIG. 1, and a set of forward, spaced-apart vertical support plates 29 located at the forward end of the intermediate base plate 26 as best seen in FIG. 1. The first, vertical, intermittor drive housing 27, the set of spaced-apart, midway vertical support plates 28 and the set of spaced-apart, forward vertical support plates 29 all are seated on and secured to a lower base plate 31 that extends for the full length of the conveyor and that in turn is secured to and supported by a base frame 32 on which the entire walking beam conveyor mechanism is mounted.

FIG. 9 of the drawings illustrates the manner in which the rotatable drive shaft 16B is journalled in pillow blocks 33 which are seated on and supported by a forward, upper base plate 34 secured across the top of the spaced-apart forward, vertical support plates 29 that in turn are supported by the lower base plate 31 and base frame 32.

From the preceeding description and a consideration of FIGS. 6, 8, 9 and 5, it will be seen that the T-shaped supporting truss 12 formed by the lower and upper interconnected rectangular-shaped supporting frames comprised by the truss members 12A through 12J and the walking beam member 11, all are supported in space by the roller wheels 17A, 17B, 17C and 17D which cause the supporting truss 12 and walking beam member 11 to move up and down along a vertical axis of movement upon rotation of crank arms 15A through 15D as described earlier with respect to FIG. 4 of the drawings.

Referring now to FIGS. 1, 7 and 10 of the drawings, it will be seen that the horizontal drive crank arm 18 is connected to the rotatable shaft 19 which in turn is driven by a second or horizontal intermittor drive means 35 through an overload clutch 36. The housing of the horizontal intermittor drive means 35 is seated on and directly secured to the intermediate base plate 26 at a location along the length thereof substantially directly over the midway, spaced-apart vertical support plates 28. The output shaft of the horizontal intermittor drive 35 is keyed to the rotatable drive shaft 19 along a common rotational axis through the medium of the overload clutch 36 as best seen in FIG. 10. Thus, it will be seen that the horizontal crank arm 18 is directly driven by the horizontal intermittor drive 35 through the overload clutch 36. The roller wheel 21 secured to the outer end of crank arm 18 is designed to ride in and follow the rollerway guide surfaces 14C formed in the vertically extending truss arm 12C comprising the base of the T-shaped supporting truss member 12 as shown in FIGS. 7&10 of the drawings. By this construction, the supporting truss 12 and walking beam member 11, which are freely supported on roller wheels 17A–17D by scotch yoke guideways 14A, 14B and 14J are driven back and forth intermittently along a horizontal axis by the horizontal intermittent drive 35 via crank arm 18 and vertically extending truss arm 12C as was described previously with respect to FIGS. 3 and 4 of the drawings.

The vertical intermittor drive 27 and the horizontal intermittor drive 35 are driven in common by an electric motor 41 through a speed reducing gear 42 and an overload clutch 43 preferably connected intermediate the output of motor 41 and the input to the speed reducing gear 42. The speed reducing gear 42 drives an output shaft that is keyed to and drives in common a sprocket wheel 44 and a sprocket wheel 47 as best shown in FIGS. 6, 7 and 1. Sprocket wheel 44 comprises part of a drive coupling means for the horizontal intermittor drive means and is coupled through a sprocket chain 45 to drive a sprocket wheel 46 that is keyed to and drives the input shaft of the horizontal drive 35.

Both the horizontal intermittor drive 35 and the vertical intermittor drive 27 are identical in construction and operation but the phasing of their operation is adjusted so that their index and dwell periods are complementary as explained hereafter. Each of the horizontal and vertical intermittor drives comprise self-contained, parallel, cam operated index drives which are conventional, commercially available, cam operated drives manufactured and sold by the Commercial Cam and Machine Company of Chicago, Illinois, and described in U.S. Pat. Nos. 2,986,949 and 3,525,268. As shown in FIG. 12, each drive includes a set of phase displaced input cam members 101 and 102 mounted on a common input cam member shaft 103 journalled in roller bearings 104 and a set of coacting, yoke mounted follower wheels 105 and 106 mounted on a common output shaft 107 journalled in roller bearings 108 with the cam members and output follower wheels being sealed in an oil bath in an oil-tight housing 109. Each drive provides two index periods and two dwell periods interleaved with the two index periods for every two revolutions of its input shaft. During dwell periods even though the input shaft to the drive is rotated, no output rotation of the output follower wheel occurs, and during the index periods rotation of the output follower wheel does occur. The intermittor drives are designed such that they provide one complete output revolution of the output follower wheel for each two complete revolutions of the input cam member and produce a modified sine, constant velocity output intermittent rotation of the output follower wheel.

The speed reducing gear 42 is a conventional, commercially available worm gear reducer manufactured and sold by the Commercial Cam and Machine Co. and the overload clutch device 43, is of the type described in U.S. Pat. No. 3,282,387 also made and sold by the Commercial Cam and Machine Co. The electric motor 41 may be purchased from any supplier of electric motors but must have sufficient capacity to operate the intermittor drives at rated output torque for a given design load application and must have an output shaft speed within the rated input speed range of the speed reducer gear 42.

As stated above, the output shaft from the speed reducing gear 42 also is keyed to a second sprocket wheel 47 (best seen in FIG. 6 of the drawings) in common with the sprocket wheel 44 which drives horizontal intermittor 35. Sprocket wheel 47 drives the vertical intermittor 27 and for this purpose is coupled to and drives a sprocket wheel 48 through a sprocket chain 49 (FIG. 7). Sprocket wheel 48 is keyed to and drives the input cam member of the vertical intermittor drive 27. The output cam follower of vertical intermittor drive 27 is shafted to and drives a sprocket wheel 51 through an overload clutch 52 that is similar in construction and operation to the overload clutch 36 described earlier. Sprocket wheel 51 in turn drives a sprocket wheel 53 through a chain drive 54. The sprocket wheel 53 is keyed to and drives an idler shaft 55 that is journalled in pillow blocks 56 secured to and supported by the lower base plate 31 as shown in FIGS. 1, 7 and 8 of the drawings.

As best seen in FIG. 8 of the drawings, the idler shaft 55 in addition to the input sprocket wheel 53 is keyed to and drives two sprocket wheels 57 and 62. Sprocket wheel 57 is coupled through a sprocket chain 58 to a sprocket wheel 59 that is secured to and drives the rotatable drive shaft 16A through a phase adjusting device 61 whose purpose will be described hereafter. The sprocket wheel 62 drives a sprocket chain 63, best seen in FIG. 7, that in turn is coupled to and drives a sprocket wheel 64 shown in FIG. 9 of the drawings. Sprocket wheel 64 is connected to and drives the rotatable shaft 16B through a phase adjusting device 65. The phase adjusting devices 65 on rotatable shaft 16B and 61 on rotatable shaft 16A provide a means for adjusting movement of the crank arms 15B and 15D on shaft 16B with respect to movement of the crank arms 15A and 15C on shaft 16A in order to assure that the four crank arms lift the supporting truss 12 and walking beam member 11 substantially simultaneously and that all four crank arms assume a proportionate part of the load being lifted by the walking beam member 11. In addition, the phase adjusting devices 61 and 65 provide a means for adjusting length of the horizontal stroke to a limited extent by establishing at what point in their revolution the crank arms cause the walking beam member to assume and thereafter deposit the load.

From the foregoing description, it will be appreciated that upon initiation of operation of the walking beam conveyor, motor 41 rotates sprocket wheels 44 and 47 through the speed reducing gear 42 either directly or through the overload clutch 43, if provided. Speed reducing gear 42 reduces the speed of motor 41 down from its designed rotational speed to a much lower speed. For example, motor 41 may be designed to provide an output shaft rotation of 1200 revolutions per minute and the speed reducing gear 42 reduces this rotational speed down to the order of 20 revolutions per minute which is more compatible with the rotational speeds of the crank arms and sprocket wheel and chain drive couplings used to drive the crank arms that intermittently move the walking beam member. The overload clutch 43, if used, senses any overload torque that is transmitted through the system back to motor 41 and upon the occurrence of an overload torque in excess of a safe value, serves to decouple the shaft of motor 41 from the speed reducing gears 42 and thereafter automatically recouples the two drive arrangements back together upon the removal of the excessive torque overload.

The output shaft from the speed reducing gear 42 rotates sprocket wheels 44 and 47 in synchronism since they are keyed in common to the speed reducing gear output shaft. Sprocket wheel 47 in turn rotates the input cam to the vertical intermittor drive 27 by means of sprocket chain 49 and sprocket wheel 48. As discussed earlier, the vertical intermittor 27 provides two index periods wherein output rotational movement occurs interspersed with two dwell periods during which the output shaft is not rotated and starts with an index period. Thus, for each two input revolutions of sprocket wheel 48 there is one complete output revolution of the sprocket wheel 51 which is coupled to the output cam follower of vertical intermittor 27 through the overload clutch device 52. Overload clutch device 52, similar to overload clutch 43, senses any overload torque that occurs in the system and immediately disconnects the output cam follower of vertical intermittor 51 from the sprocket wheel 51 and upon removal of the excessive overload torque automatically recouples the two drive trains back together. Vertical intermittor output sprocket 51 is coupled via sprocket chain 54 to sprocket wheel 53 on idler shaft 55 and causes idler shaft 55 to be rotated intermittently during each index period of vertical intermittor drive 27. During the dwell periods of vertical intermittor 27 idler shaft 55 remains still. This intermittent rotation of idler shaft 55 is transmitted through sprocket wheel 57, chain drive 58 and sprocket wheel 59 to rotatable shaft 16A via the phase adjuster 61 and is transmitted through sprocket wheel 62, sprocket chain 63, sprocket wheel 64 and phase adjuster 65 to the rotatable shaft 16B. Accordingly, it will be appreciated that intermittent rotation of the rotatable drive shafts 16A and 16B is achieved by this drive coupling arrangement whereby the crank arms 15A–15D intermittently are moved upwardly through a 180° arc from their lower or home position shown in FIG. 1 to their uppermost position. This movement occurs during the first index period of the vertical intermittor drive 27. The crank arms 15A–15D are retained in this raised position during the ensuing dwell period of the vertical intermittor drive. Thereafter, the crank arms are rotated through an additional 180° arc to return them to their lower or home position shown in FIG. 1 during the second index period of the vertical intermittor 27 and are retained in this lowered position during the ensuing dwell period which completes one output cycle of the vertical intermittor 27.

Simultaneously with the above-described operation of the intermittent vertical movement of the mechanism, the output shaft of speed reducer 42 also is rotating the sprocket wheel 44 that drives the input to the horizontal intermittor drive via sprocket chain 45 and input sprocket wheel 46 at the same input rotational speed and same input phase as the vertical intermittor 27. However, the connection of the input sprocket wheel 46 to the shaft of the input cam to horizontal intermittor drive 35 is set such that the horizontal intermittor drive 35 initially commences its operation at the beginning of a dwell period in contrast to the vertical intermittor 27 which starts with an index period. Thus, during the initial one-half revolution of sprocket wheels 44 and 47 (and hence horizontal intermittor input sprocket wheel 46) while the vertical intermittor drive 27 is raising the crank arms 15A–15D to their raised position during the initial index period of vertical intermittor 27 as described above, there is no output rotation of the output cam follower of horizontal intermittor 35 due to the fact that it is passing through a dwell period. During the next succeeding half revolution of input sprocket wheel 46, horizontal intermittor drive 35 passes through its initial index period to cause a one-half revolution of its output cam follower. This one-half revolution output is transmitted through the overload clutch device 36 directly to the horizontal drive crank arm 18 and in turn causes the T-shaped supporting truss 12 and walking beam member 11 to be moved forwardly as described earlier with relation to FIG. 4 of the drawings. Thereafter, the horizontal intermittor drive 35 passes through its second dwell period while vertical intermittor drive 27 is returning the crank arms 15A–15D to their lowered position and then sequentially passes through the second index period to return the walking beam conveyor to its left-most or home position. From this description, it will be appreciated that by properly phasing the initial starting position of the horizontal intermittor drive 35 with respect to the initial starting position of the vertical intermittor drive 27, so that one is initially started during its dwell period while the other is initially started during its index period, respectively, the desired up-forward-down-back intermittent pattern of movement described earlier with respect to FIGS. 3 and 4 is achieved.

In addition to the above-described features, as shown in FIG. 7, each of the back and forward upper base plates 23 and 34, respectively, are secured to their respective, spaced-apart, vertical supporting plates by set screws (not shown) and pillow block adjustment threaded bolts 66 and jam nuts 67 whereby tension on the sprocket chains 58 and 63, respectively, can be adjusted. A similar, pillow block position adjustment arrangement is shown at 68 for adjusting the tension of the sprocket chains 45 and 49, respectively, by extending the longitudinal spacing of the output shaft from speed reducer 42 which drives the sprocket wheels 44 and 47 relative to sprocket wheels 46 and 48, respectively.

In addition to the above-described features, the invention further includes a spring driven, counter-balancing torque arrangement for assisting the vertical intermittor drive train in both lifting and depositing a load with the walking beam at the beginning and end of each cycle of operation. The counter-balancing torquing arrangement is best shown in FIGS. 1, 5, 3 and 11 of the drawings and comprises a coil compression spring 71 supported within an outer cylindrical tubular protective housing 72 that is secured to the lower base plate 31 by upright support pedestals 73. The coil compression spring 71 has one of its ends secured to a fixed cross bolt 74 secured across the back end of the tubular housing 72. The remaining end of coil compression spring 72 is secured by a shackle 75 to a cable 76. Cable 76 is guided between the rollers of a pair of upper and lower guide pulley wheels 77 and 78 rotatably mounted on an upright support plate 80 that extends parallel to the spaced-apart vertical support plates 29 as best seen in FIG. 5 of the drawings. The end of cable 76 is secured to the outer end of a counter torquing crank arm 79. A duplicate set of these counter-balancing torquing components is mounted on the opposite side of the conveyor mechanism and are identified with the same reference numerals primed. This duplicate set terminates in a counter torquing arm 79' as best shown in FIG. 5.

Counter torquing crank arms 79 and 79' are secured to the ends of a counter torquing shaft 81 that is journalled in pillow blocks 85 secured to the ends of upright support plates 29 and drives a counter torquing sprocket wheel 82. The sprocket wheel 82 is coupled by sprocket chain 83 to a counter torquing sprocket 84 keyed to and rotatable with the rotatable shaft 16B along with the vertical drive sprocket wheel 64 as shown in FIGS. 5 and 9 of the drawings. The counter torquing shaft 81 is journalled in a set of pillow blocks 85 that are secured to the ends of the vertical support plates 29. If desired, this could be done by means of set screws (not shown) and the exact positioning thereof adjusted by a pillow block adjusting bolt and lock nut arrangement similar to that described previously. As stated above, there are two sets of coiled counter-balancing springs 71 and surrounding cylindrical housings 72 and 72' together with related guide pulley wheels 77, 77' and 78, 78' and counter torquing crank arms 79, 79' secured to the respective ends of the counter torquing shaft 81 by suitable hub mountings 88 and 88'. By means of this arrangement the counter-balancing torquing forces applied to the ends of the counter torquing crank arms 79 and 79' are evenly applied to each end of the counter torquing crank shaft 81. The counter-balancing forces thus applied are transmitted back through the sprocket wheel 82, sprocket chain 83 and sprocket wheel 84 to the rotatable drive shaft 16B and the rest of the vertical drive transmission system described previously with respect to FIGS. 1–10 of the drawings.

During operation of the walking beam conveyor, the intermittent rotation imparted to the rotatable shaft 16B during the intermittent up-forward-down-back movement of the walking beam member, will be transmitted to counter torquing shaft 81 by the intercoupling provided through sprocket wheels 84 and 82 and chain 83. As described previously, the phasing of the vertical intermittor drive 27 is such that the initial indexing output causes one-half revolution of the shaft 16B. This in turn will cause a one-half revolution of the counter torquing crank arms 79 and 79' from an initial 9 o'clock position through 180° to the 3 o'clock pointing as shown in FIG. 1 position. As the walking beam member 11 is moved upwardly to the up position, it starts unloaded and then about halfway through its up motion it engages the load and lifts it to the topmost position. The phasing is such that the counter torquing crank arms 79 and 79' rotate through substantially 180° to the point where the counter-balancing coil springs 71 and 71' are placed under greatest tension. This cocking of coil springs 71 and 71' occurs while the walking beam member is still in an unloaded condition. Ideally, at the 3 o'clock position, the walking beam member 11 engages and starts to lift the load. It is precisely at this point that the coil spring 71 begins to contract and provide a constant level lifting force via the chain 83 and sprockets 82 and 84 to assist the vertical drive assembly in lifting the load. Thereafter, the crank arms 79 and 79' will remain in the 9 o'clock pointing position where the coil spring 71 is still cocked while vertical intermittor 27 passes through the first of its dwell period and the walking beam conveyor is transited to its forwardmost position by the horizontal drive mechanism as described previously.

Upon reaching the forwardmost position of the walking beam member, the vertical intermittor drive 27 then cycles through its second indexing period to lower the walking beam member and consequently to rotate the counter torquing crank arms 79 and 79' from their 9 o'clock position to their 3 o'clock position shown in FIGS. 1 and 5. The phasing of this rotation is such that the forces constrained in coil springs 71 and 71' while the torquing crank arms 79 and 79' are rotated, provide constant lift force through total walking beam travels—in particular, through total vertical position range. Force level is set to compensate for load, supporting truss 12, walking beam member 11 and the rest of the system. During this downward movement of the conveyor, as the torquing crank arms 79 and 79' rotate to and through the 3 o'clock position where they are in substantial longitudinal alignment with the compression springs 71 and 71'. At this point, maximum forces will be exerted by the springs representing high spring energy and corresponding to low potential energy in walking beam where it is in the lowest position. The design of the focal points of the pulley location, 77, 77' and 78, 78', the length of the torquing crank arms 79, 79', the spring forces and the spring rates are all designed to provide optimized counter-balancing for all positions of the walking beam member and related parts of appreciable weight that are moved vertically during operation of the conveyor. By this arrangement the load carrying capabilities of a walking beam conveyor can be optimized using given size load range intermittor drive, electric motor, and speed reducing gear components.

From the foregoing description, it will be appreciated that the invention provides a new and improved compact, low cost, walking beam conveyor of intermediate and substantial load carrying capability. This novel walking beam conveyor utilizes a relatively simple mechanical drive system employing easily obtained and relatively inexpensive, commercially available components and further includes a spring developed, counter-balancing torquing arrangement to assist the walking beam conveyor in a manner such that minimum size drive components can be used for any given design load range.

Having described one embodiment of a new and improved walking beam conveyor according to the invention, it is believed obvious that other modifications and variations of the invention will be suggested to those skilled in the art in the light of the above teachings. It is therefore to be understood that changes may be made in the particular embodiment of the invention disclosed which are within the full intended scope of the invention as defined by the appended claims. As an example: A second vertical intermittor can be driven in series with intermittor #27. This would be used to drive links 15B to 15D directly. Likewise, intermittor #27 would be devoted to driving links 15A and 15C synchronously with the other two. This approach would eliminate chain transmissions. Variations in working characteristics and work environment influences the design approach selection.

What is claimed is:
1. A walking beam conveyor comprising:
 (a) a supporting truss and walking beam member for transporting loads in a straight-line path between two points comprising pick-up and discharge stations for the load:
 (b) said supporting truss and walking beam member comprising first and second orthogonally arrayed interconnected supporting truss arms:
 (c) said first and second truss arms each including guide means thereon extending along the longitudinal axis of the truss arms;
 (d) first and second guide means engaging devices for engaging the guide means on said first and second truss arms, respectively, and for physically supporting and moving said supporting truss and walking beam member along two orthogonal axes of movement;
 (e) first and second rotatable crank arm means having said first and second guide means engaging devices secured to respective ends thereof for driving said guide means engaging devices;
 (f) first and second intermittor drive means;
 (g) means interconnecting the output of said first and second intermittor drive means with said first and second rotatable crank arm means, respectively, for intermittently rotating the respective first and second crank arm means in a predetermined intermittent manner;
 (h) base frame means supporting said intermittor drive means and said first and second crank arm means together with their respective interconnecting means and guide means engaging devices which in turn physically and movably support the supporting truss and walking beam member in a compact structure; and
 (i) spring biased counter-balancing means mounted on said base frame means and including a spring actuated lever arm and counter torque coupling means for applying a counter-balancing torque to at least one of the rotatable crank arm means to assist the same in developing a load supporting force and thereby minimize the forces demanded of the intermittor drive means.

2. A walking beam conveyor according to claim 1 further including electric motor drive means and speed reducing gear means supported on said base frame means, said electric motor drive means being mechanically coupled to and driving said intermittor drive means through said speed reducing gear means.

3. A walking beam conveyor according to claim 2 wherein said supporting truss is T-shaped in configuration and wherein the cross arms of the T comprise the first truss arm and form a vertical scotch yoke guide means for physically supporting and moving the supporting truss and walking beam member up and down in a vertical direction and the base of the T comprises the second truss arm and serves as a horizontal scotch yoke guide means for moving the supporting truss and walking beam member forward and back in a horizontal direction.

4. A walking beam conveyor according to claim 3 wherein the supporting truss further includes an additional first truss arm extending parallel to the first truss arm formed by the cross arms of the T-shaped truss and interconnected by laterally extending truss arms with said first truss arm to form a rectangular frame that extends in a plane substantially at right angles with respect to the base of the T-shaped truss, said additional first truss arm also including scotch yoke guide means extending along the longitudinal axis thereof and wherein separate scotch yoke guide means engaging devices are provided for both the additional first truss arm and the first truss arm formed by the cross bar of the T-shaped truss member with each scotch yoke guide means engaging device being driven by a separate rotatable first crank arm means driven in common by said first intermittor drive means for moving said supporting truss and walking beam member up and down along a vertical axis of movement.

5. A walking beam conveyor according to claim 4 wherein the means interconnecting the output from the first intermittor drive means to the first crank arm means comprises separate drive shafts rotatably supported on said base frame means near each end of the walking beam conveyor with each of the rotatable drive shafts having separate drive coupling means interconnecting the output of said first intermittor to the respective drive shafts and with each drive shaft being connected to and driving respective first crank arms keyed to each of the ends thereof, and wherein each of the first crank arms support respective scotch yoke guide means engaging devices for engaging scotch yoke guide means formed on the horizontally extending first and additional first truss arms, respectively.

6. A walking beam conveyor according to claim 1 further including phase adjusting means mounted intermediate the first and second intermittor drive means and their respective first and second rotatable crank arm means for adjusting the phase relation of the intermittent movement imparted to the supporting truss and walking beam member by said respective first and second intermittor drive means.

7. A walking beam conveyor according to claim 5 further including phase adjusting means mounted intermediate the first and second intermittor drive means and their respective first and second rotatable crank arm means for adjusting the phase relation of the intermittent movement imparted to the supporting truss walking beam member by said respective first and second intermittor drive means.

8. A walking beam conveyor according to claim 1 further including overload clutch means connected intermediate the outputs of the first and second intermittor drive means and their respective first and second crank arm means.

9. A walking beam conveyor according to claim 7 further including overload clutch means connected intermediate the outputs of the first and second intermittor drive means and their respective first and second crank arm means.

10. A walking beam conveyor according to claim 1 wherein said spring biased counter-balancing means comprises a rotatable counter torquing shaft rotatably mounted on said base frame means and having counter torque coupling means intercoupled with the first rotatable crank arm means for imparting counter-balancing torque thereto, counter torquing crank arm means secured to said counter torquing shaft and counter-balancing spring means interconnected between the ends of said counter torquing crank arm means and the base frame means for imparting a counter-balancing bias torque to said first crank arm means via said counter torquing crank arm means.

11. A walking beam conveyor according to claim 9 wherein said spring biased counter-balancing means comprises a rotatable counter torquing shaft rotatably mounted on said base frame means and having counter torque coupling means interconnected with the rotatable drive shafts for imparting a counter-balancing torque thereto, counter torque crank arms secured to opposite ends of said counter torquing shaft and counter-balancing coil springs enclosed within protective tubes and respectively interconnected between the ends of said counter torquing crank arms and the base frame means for imparting a counter-balancing bias torque to said rotatable drive shafts and hence to said first crank arms.

12. A walking beam conveyor according to claim 1 wherein the first guide means engaging device secured to the ends of the first rotatable crank arm means includes roller wheels having a V-shaped outer periphery and wherein the guide means formed on the first truss arms includes a complementary V-shaped surface engaged by the V-shaped roller wheels for providing lateral stability to the supporting truss and walking beam member.

13. A walking beam conveyor according to claim 9 wherein the first scotch yoke guide means engaging device secured to the ends of the first rotatable crank arm means includes roller wheels having a V-shaped outer periphery and wherein the scotch yoke guide means formed on one of the first truss arms and additional first truss arms have complementary V-shaped surfaces engaged by the V-shaped roller wheels for providing lateral stability to and supporting one side of the supporting truss and walking beam member and wherein the first scotch yoke guide means engaging device secured to the ends of the first crank arm means further includes elongated roller bearing members having a cylindrical roller bearing surface coacting will substantially flat rollerway guide surfaces that comprise the scotch yoke guide means formed on the remaining first and additional first horizontally extending truss arms for supporting and moving the opposite side of the supporting truss and walking beam member whereby the V-shaped roller wheels on one of the horizontally extending first truss arms at one side of the walking beam conveyor provide up-down lifting forces and lateral stability to the structure and the roller bearing members coacting with the remaining horizontally extending first truss arm on the opposite side of the walking beam conveyor provide required up-down lifting forces and freedom for movement along the longitudinal axis of the first truss arm together with lateral freedom of movement so that there are no stringent conflicting restraining forces internally generated between the interrelated support truss members that otherwise might be caused by slight errors in assembly and manufacturing of the structure.

14. A walking beam conveyor according to claim 4 wherein said supporting truss and in particular the truss arms thereof are comprised by internally facing open sided U-shaped channel members wherein the internally facing open sided U-shaped channel in each truss arm forms the scotch yoke guide means.

15. A walking beam conveyor according to claim 13 wherein said supporting truss and in particular the truss arms thereof are comprised by internally facing open sided U-shaped channel members wherein the internally facing open sided U-shaped channel in each truss arm forms the scotch yoke guide means.

16. A walking beam conveyor according to claim 15 wherein the spacing between the opposed surfaces of the U-shaped channel members is proportioned to capture the roller wheels and roller bearings, respectively, and prevent detracking of the wheels during operation of the walking beam conveyor.

17. A walking beam conveyor according to claim 5 wherein said drive coupling means comprises a sprocket wheel driven by the first intermittor drive means, a sprocket wheel driving each of said rotatable drive shafts and chain drive couplings interconnecting the sprocket wheel driven by said first intermittor drive means to the sprocket wheels driving said rotatable drive shafts.

18. A walking beam conveyor according to claim 17 wherein said drive coupling means further includes an idler shaft, a sprocket wheel and chain drive coupling from said first intermittor drive means to said idler shaft and a sprocket wheel and chain drive coupling between said idler shaft and each of the sprocket wheel driven rotatable shafts.

19. A walking beam conveyor according to claim 1 wherein the first and second intermittor drive means each comprise self-contained, parallel, cam operated index drives each including an input cam member and an output follower wheel sealed in an oil bath in an oil-tight housing, each of said index drives providing two dwell periods and two index periods for each complete revolution of the output follower wheel corresponding to two complete revolutions of the input cam member and the output follower wheel provides a modified sine, constant velocity output and is connected to and drives a respective one of the first and second rotatable crank arm means in a predetermined manner, and the dwell and index periods of the first and second intermittor drive means are appropriately phased to provide an up-forward-down-back repetitive pattern of movement to the walking beam member.

20. A walking beam conveyor according to claim 18 wherein the first and second intermittor drive means each comprise self-contained, parallel, cam operated index drives each including an input cam member and an output follower wheel sealed in an oil bath in an oil-tight housing, each of said index drives providing two dwell periods and two index periods for each complete revolution of the output follower wheel corresponding to two complete revolutions of the input cam member, the output follower wheel of the first intermittor drive means is connected to and drives the sprocket wheel driving said idler shaft through the sprocket wheel and chain drive coupling to thereby rotate said first crank arm means and move said walking beam member up and down along a vertical axis in a predetermined intermittent manner, and the output follower wheel of the second intermittor drive means is directly shafted to and rotates the second crank arm means to move the walking beam member back and forth along a horizontal axis in a predetermined intermittent manner coordinated with the intermittent movement of the walking beam member along the vertical axis by appropriate phasing of the dwell and index periods of the first and second intermittor drive means and thereby provide an up-forward-down-back repetitive pattern of movement of the walking beam member.

21. A walking beam conveyor according to claim 1 wherein the phasing of the spring actuated lever arm and counter torque coupling means relative to the rotatable crank arm means is such that the counter lifting torque supplied by the spring biased counter-balancing means is applied to the crank arm means just prior to or at the time of assumption of a load by the walking beam member at a pick-up station and is removed at or near the time of deposit of a load by the walking beam member at a discharge station.

22. A walking beam conveyor according to claim 11 wherein the phasing of the spring actuated lever arm and counter torque coupling means relative to the rotatable crank arm means is such that the counter lifting torque supplied by the spring biased counter-balancing means is applied to the crank arm means just prior to or at the time of assumption of a load by the walking beam member at a pick-up station and is removed at or near the time of deposit of a load by the walking beam member at a discharge station.

23. A walking beam conveyor according to claim 20 wherein the phasing of the spring actuated lever arm and counter torque coupling means relative to the rotatable crank arm means is such that the counter lifting torque supplied by the spring biased counter-balancing means is applied to the crank arm means just prior to or at the time of assumption of a load by the walking beam member at a pick-up station and is removed at or near the time of deposit of a load by the walking beam member at a discharge station.

* * * * *